United States Patent
Akiyama

(10) Patent No.: US 9,744,899 B2
(45) Date of Patent: Aug. 29, 2017

(54) METHOD FOR PROVIDING CONTROL SYSTEM OF VEHICLE, ELECTRIC CONTROL UNIT AND HEADLIGHT CONTROL SYSTEM

(71) Applicant: DENSO CORPORATION, Kariya, Aichi-pref. (JP)

(72) Inventor: Susumu Akiyama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/734,076

(22) Filed: Jun. 9, 2015

(65) Prior Publication Data
US 2015/0266409 A1 Sep. 24, 2015

Related U.S. Application Data

(63) Continuation of application No. 11/283,578, filed on Nov. 18, 2005, now Pat. No. 9,073,553.

(30) Foreign Application Priority Data

Nov. 19, 2004 (JP) .................................. 2004-336548

(51) Int. Cl.
*B60Q 1/04* (2006.01)
*B60Q 1/12* (2006.01)
(Continued)

(52) U.S. Cl.
CPC .............. *B60Q 1/04* (2013.01); *B60Q 1/076* (2013.01); *B60Q 1/08* (2013.01); *B60Q 1/12* (2013.01);
(Continued)

(58) Field of Classification Search
CPC . B60Q 1/04; B60Q 1/076; B60Q 1/08; B60Q 1/12; B60Q 1/1423; B60W 10/06;
(Continued)

(56) References Cited

U.S. PATENT DOCUMENTS 5,019,759 A 5/1991 Takemura et al.
5,081,583 A 1/1992 Kono et al.
(Continued)

FOREIGN PATENT DOCUMENTS

JP 63-88930 4/1988
JP 02-290745 11/1990
(Continued)

OTHER PUBLICATIONS

Notification of Reasons for Rejection dated Sep. 1, 2009 by the Japanese Patent Office for counterpart Japanese Application No. JP 2004-336548.
(Continued)

*Primary Examiner* — Nicholas Kiswanto
(74) *Attorney, Agent, or Firm* — Harness, Dickey & Pierce, P.L.C.

(57) ABSTRACT

A method of preparing a vehicle control system having an intended function by using at least two ECUs is provided. One of the at least two ECUs is used for adaptively incorporating a modified portion of the intended function of the vehicle control system through re-design in a short period, while the rest of the ECUs in the vehicle control system sustain and support an unchanging portion of the intended function of the vehicle control system.

12 Claims, 7 Drawing Sheets

(51) Int. Cl.

| | | |
|---|---|---|
| *B60Q 1/14* | (2006.01) | |
| *B60W 10/06* | (2006.01) | |
| *B60W 10/30* | (2006.01) | |
| *B60W 30/16* | (2012.01) | |
| *B60W 50/00* | (2006.01) | |
| *B60R 21/015* | (2006.01) | |
| *B60Q 1/076* | (2006.01) | |
| *B60Q 1/08* | (2006.01) | |
| *B60W 30/165* | (2012.01) | |
| *B60R 21/013* | (2006.01) | |
| *B60R 21/01* | (2006.01) | |

(52) U.S. Cl.
CPC ...... *B60Q 1/1423* (2013.01); *B60R 21/01512* (2014.10); *B60W 10/06* (2013.01); *B60W 10/30* (2013.01); *B60W 30/16* (2013.01); *B60W 30/165* (2013.01); *B60W 50/00* (2013.01); *B60Q 2300/322* (2013.01); *B60Q 2300/42* (2013.01); *B60R 21/013* (2013.01); *B60R 21/01544* (2014.10); *B60R 2021/01047* (2013.01); *B60W 50/0098* (2013.01); *B60W 2550/12* (2013.01); *B60W 2600/00* (2013.01); *B60W 2720/10* (2013.01); *B60W 2750/308* (2013.01)

(58) Field of Classification Search
CPC .... B60W 10/30; B60W 30/16; B60W 30/165; B60W 50/00; B60R 21/01512
See application file for complete search history.

(56) References Cited

U.S. PATENT DOCUMENTS

| | | | |
|---|---|---|---|
| 5,142,474 A | 8/1992 | Miyata et al. | |
| 5,572,484 A | 11/1996 | Gaus et al. | |
| 5,826,951 A | 10/1998 | Sano | |
| 5,837,994 A * | 11/1998 | Stam | B60Q 1/085 250/208.1 |
| 6,097,023 A * | 8/2000 | Schofield | B60N 2/002 250/208.1 |
| 6,104,971 A | 8/2000 | Fackler | |
| 6,181,563 B1 | 1/2001 | Shimbo et al. | |
| 6,202,012 B1 | 3/2001 | Gile et al. | |
| 6,321,150 B1 | 11/2001 | Nitta | |
| 6,360,152 B1 | 3/2002 | Ishibashi et al. | |
| 6,403,942 B1 * | 6/2002 | Stam | B60Q 1/085 250/208.1 |
| 6,643,577 B1 | 11/2003 | Padgett et al. | |
| 6,860,351 B2 | 3/2005 | Landes et al. | |
| 6,982,648 B2 | 1/2006 | Cros et al. | |
| 7,008,069 B2 | 3/2006 | Ostreko et al. | |
| 7,222,006 B2 | 5/2007 | Proefke et al. | |
| 7,319,923 B2 | 1/2008 | Hoenninger et al. | |
| 7,366,600 B2 | 4/2008 | Osaki et al. | |
| 7,483,778 B2 | 1/2009 | Armbruster et al. | |
| 8,100,552 B2 * | 1/2012 | Spero | B60Q 1/04 362/227 |
| 9,313,862 B1 * | 4/2016 | Helton | H05B 37/0272 |
| 2001/0032042 A1 | 10/2001 | Disser et al. | |
| 2002/0045952 A1 | 4/2002 | Blemel | |
| 2002/0185358 A1 | 12/2002 | Zeitler et al. | |
| 2003/0038719 A1 | 2/2003 | Mattes et al. | |
| 2004/0010322 A1 | 1/2004 | Tanaka | |
| 2004/0024502 A1 | 2/2004 | Squires et al. | |
| 2004/0044448 A1 | 3/2004 | Ramaswamy et al. | |
| 2004/0083043 A1 | 4/2004 | Akiyama et al. | |
| 2004/0149504 A1 | 8/2004 | Swoboda et al. | |
| 2005/0085953 A1 | 4/2005 | Hoenninger et al. | |
| 2005/0232437 A1 | 10/2005 | Albus et al. | |
| 2005/0234603 A1 | 10/2005 | Bale et al. | |
| 2005/0270621 A1 | 12/2005 | Bauer et al. | |
| 2006/0155469 A1 | 7/2006 | Kawasaki | |
| 2007/0253210 A1 * | 11/2007 | Hasegawa | B60Q 1/143 362/464 |
| 2007/0276551 A1 * | 11/2007 | Brod | B60Q 1/1415 701/1 |
| 2007/0291383 A1 | 12/2007 | Watson et al. | |
| 2008/0100139 A1 * | 5/2008 | Michiyama | B60Q 1/1423 307/10.8 |
| 2008/0259619 A1 * | 10/2008 | Tyll | B60Q 1/0005 362/464 |
| 2011/0012511 A1 * | 1/2011 | Watanabe | B60Q 1/085 315/82 |
| 2011/0025209 A1 * | 2/2011 | Nakanishi | B60Q 1/12 315/82 |
| 2012/0313523 A1 * | 12/2012 | Futamura | B60Q 1/143 315/79 |
| 2014/0232265 A1 * | 8/2014 | Masuda | B60Q 1/1423 315/82 |
| 2015/0002015 A1 * | 1/2015 | Hayakawa | B60Q 1/143 315/82 |

FOREIGN PATENT DOCUMENTS

| | | |
|---|---|---|
| JP | 6-22189 | 1/1994 |
| JP | 7-131464 | 5/1995 |
| JP | 08-180934 | 7/1996 |
| JP | 10-170311 | 6/1998 |
| JP | 11-042957 | 2/1999 |
| JP | 11-91464 | 4/1999 |
| JP | 11-232241 | 8/1999 |
| JP | 2001-145233 | 5/2001 |
| JP | 2002-314558 | 10/2002 |
| JP | 2003-132407 | 5/2003 |
| JP | 2003-191788 | 7/2003 |
| JP | 2004-066974 | 3/2004 |
| JP | 2004-109057 | 4/2004 |
| JP | 2004-523953 | 8/2004 |
| JP | 2004-245199 | 9/2004 |
| JP | 2004-289306 | 10/2004 |

OTHER PUBLICATIONS

Notification of Reasons for Rejection dated Feb. 1, 2010 by the Japanese Patent Office for counterpart Japanese Application No. JP 2004-336548.

Office Action dated Oct. 26, 2010 in corresponding Japanese Application No. 2004-336548.

Office Action dated Nov. 1, 2011 in corresponding Japanese Application No. 2004-336548.

Office Action dated Dec. 11, 2012 in corresponding Japanese Application No. 2011-109051, a divisional of Japanese Application No. 2004-336548, with English translation.

Office Action dated Apr. 2, 2013 in corresponding Japanese Application No. 2011-109051, a divisional of Japanese Application No. 2004-336548, with English translation.

Office Action mailed Jan. 14, 2014 in corresponding Japanese Application No. 2013-112717, a divisional of Japanese Application No. 2004-336548, with English translation.

Office Action mailed May 20, 2014 in corresponding Japanese Application No. 2013-112717, a divisional of Japanese Application No. 2004-336548, with English translation.

U.S. Appl. No. 11/283,578, filed Nov. 18, 2005, Susumu Akiyama.

* cited by examiner

US 9,744,899 B2

METHOD FOR PROVIDING CONTROL SYSTEM OF VEHICLE, ELECTRIC CONTROL UNIT AND HEADLIGHT CONTROL SYSTEM

CROSS REFERENCE TO RELATED APPLICATION

This application is a continuation Application of U.S. patent application Ser. No. 11/283,578 filed on Nov. 18, 2005. This application claims the benefit and priority of Japanese Patent Application 2004-336548, filed Nov. 19, 2004. The entire disclosures of each of the above applications are incorporated herein by reference.

FIELD OF THE INVENTION

The present invention generally relates to a control system being used for controlling various systems in a vehicle.

BACKGROUND OF THE INVENTION

In recent years, various types of electrical controls are used in a vehicle for achieving improvement in fuel consumption, safety, convenience or the like. That is, areas of functionality of electric control units (ECUs) are broadened and the number of the features in the ECU is increasing.

Further, the ECUs in the vehicle are interconnected with each other through a wired/wireless network for the exchange of control data and interactive operation. This kind of network is a so-called vehicle LAN.

Each of those ECUs is used for controlling a specific mechanism in the vehicle, and thus is named after its function. That is, the types of ECUs includes an engine ECU for controlling an engine, a cruise control ECU for controlling vehicle speed and an inter-vehicle distance, a transmission ECU for controlling an automatic transmission and the like. The various schemes of the use of the ECUs for the vehicle are disclosed in Japanese Patent Document No. JP-A-2004-136816, for example.

However, the ECU dedicated for a specific purpose is in-flexible in terms of a change/modification in the ECU, because of a rigid combination of circuits used therein and/or other restrictions. That is, a partial change of the ECU function leads to an entire re-designing of the specification of the ECU, or a delay in the ECU development schedule. The re-designing and re-scheduling of ECU development cause an increased cost of production.

For example, the ECU used for a cruise control system has two main functions, that is, a function for maintaining a constant speed of a subject vehicle and a function for maintaining a constant inter-vehicle distance toward a preceding vehicle. In this case, the speed maintaining function in the cruise control ECU is fully developed that the implementation of the speed maintaining function in the ECU does not have to be changed in the future, while the inter-vehicle distance maintaining function may incorporate changes in terms of, for example, an improved algorithms for distance detection and a modification of the sensors used for distance detection. This kind of changes in the specification of an ECU and/or the sensing/actuating device connected thereto lead to a change of the design of the entire ECU.

SUMMARY OF THE INVENTION

In view of the above-described and other problems, the present invention provides a method for composing a control system as ECUs (electric control units) for facilitating the development of the control system of an automotive vehicle.

The methodology of structuring/composing/implementing the control system of the vehicle in the present invention first abstractively divides an intended functionality of the vehicle into two parts, that is, a primary/standard part that is expected to have few changes in a period in terms of development period of the control system and an additional part that is expected to have quite a few changes during the development period, and then provides different implementation bodies for each of the two parts of the intended functionality of the control system. In other words, the intended functionality of the control system in at least two separate bodies is jointly developed and yet separately implemented by a combination of a standard ECU and an additional ECU according to an optimally arbitrated division of the functionality. The methodology described above enables the development of the control system (e.g., an ECU) to be free of entire design change caused by a minor change and/or modification of the intended functionality in the course of development, and thereby decreases the total development cost of the control system including the design cost, the development period and the like. Further, the additional portion of the functionality can be selectively added, changed or omitted by simply adding, changing or omitting the additional ECU.

Furthermore, the additional portion of the functionality that is generally an expensive portion of the ECU can be customized readily and flexibly based on a specific demand of a customer of the control system as a value-added portion of the control system.

According to one aspect of the present invention, the additional portion of the control system may be integrally included in a sensor or an actuator that is used by the additional part of the functionality of the control system. In this manner, the control system can be constructed in a body having compactness.

According to yet another aspect of the present invention, a primary control system (ECU) takes charge of a cruise control for enabling a traveling of the subject vehicle in a constant speed, and a secondary control system (ECU) takes charge of an inter-vehicle distance control for enabling a traveling of the subject vehicle in a constant distance toward a preceding vehicle in a vehicle control system. The primary and the secondary control systems (ECUs) have respective bodies as the ECU in the vehicle control system intended for an integrated cruise control.

The vehicle control system composed in the above-described manner can handle and adapt to a specification change in the inter-vehicle distance control function only by changing the design of the secondary control system (ECU). Further, the inter-vehicle distance control function can easily be made separable in the vehicle control system. Furthermore, the secondary control system (ECU) may be integrated into a radar, e.g., a millimetric-wave radar, to have compactness and readiness for disposition on a circuit board.

The vehicle control system having a different control function can also be composed in the above-described manner for the ease of development management. For example, when device control functions for handling an input from switch operated by a user as well as for handling an input from a detection device for detecting a certain event are respectively borne by the primary control system and the secondary control system, a specification change in the function for handling the input from the detection device can be accommodated only by changing the design of the secondary control system (ECU). The function in the secondary control system (ECU) may easily be made optional, or removable.

The vehicle control system having the primary and secondary control systems (ECU) respectively for portions of an intended functionality included therein can be applied to various devices and systems. For example, a wiper control system for controlling operation of a wiper can accommodate a functional change only with replacement or re-designing of the secondary control system (ECU) when the changed function is implemented as the secondary control system (ECU). Another example is a headlight control system for controlling an angle of the headlight in a vertical or horizontal direction based on the input from a switch as well as the input from an on-coming vehicle detector or a road curvature detector. Changes in specification of detector control can be accommodated only by the secondary control system (ECU) when the detector control is implemented only in the secondary control system (ECU). The function in the secondary control system (ECU) may easily be made optional, or removable.

Other examples can be described as a vehicle control system for controlling a climate control apparatus, an audio-visual system or the like. When the primary control system (ECU) bears the standardized portion of the intended function and the secondary control system (ECU) bears the additional portion or added-value portion of the intended function, the added-values can readily be changed, replaced or omitted only by changing, replacing or omitting the secondary control system (ECU). The climate control apparatus may be basically controlled by an input from a switch operation of a vehicle user, and may further be adjusted based on a detection result of the number and the position of occupants in the vehicle. Specification change of climate control function may easily be accommodated or removable by simply replacing the secondary control system (ECU), or such function may easily be removed by removing the secondary control system (ECU).

The contents of the climate control functions controlled by the secondary control system (ECU) may be a blow air temperature control, for controlling air temperature of a position of an occupant based on the detected occupant position and the like.

The contents of the audio-visual functions controlled by the secondary control system (ECU) may be a sound field adjustment at the detected position of the occupant, for example, based on the basic audio control by the primary control system (ECU) according to an input from the operation switch.

The examples of this scheme for accommodating the change in specification of the ECU function are also found in a seat-belt control system in cooperation with an expected collision detection system, an engine control system in cooperation with a valve-timing control system, and an instrument panel information control system in cooperation with a head-up display control system.

In the seat-belt control system, main and sub ECUs may respectively bear the seat-belt tightening functions, upon detecting a collision of the vehicle and upon predicting a possible collision of the vehicle, for easy accommodation of specification change in a possible collision detection control only by the replacement of the sub, i.e., secondary, ECU. The removal of such functions from the system may also be easy.

In the engine control system, main and sub ECUs may respectively bear engine control functions, i.e., valve open-close timing control functions and other functions, based on the engine drive state. When the specification of the valve open-close timing functions is changed, the sub ECU controlling such functions may simply be replaced. The removal of such functions from the system may also be easy.

In the instrument panel information control system provided by the main ECU and the head-up display control system provided by the sub ECU, specification change of the head-up display control system for displaying information on a windshield may easily be accommodated by the replacement of the sub ECU. The removal of such functions from the system may also be easy.

A communication apparatus that uses a long range radio-frequency transmission in cooperation with a short range wireless transmission system may be yet another example of the above-described scheme of ECU structure. That is, the short range wireless transmission system is borne by the secondary control system (ECU) for the ease of specification change adaptation as the vehicle control system.

The long range radio-frequency transmission system may be a VICS (Vehicle Information and Communication System) in Japan which utilizes an FM frequency communication, and the short range wireless transmission system may be a DSRC (Dedicated Short Range Communication) system which is a bit less widely used and may be prone to specification change, which may be easy by the replacement of the sub ECU according to the present disclosure.

Throughout the vehicle control systems, devices and apparatus described above, the secondary control system that accommodates the value-added and therefore modification-prone portion of the intended functionality may be integrally placed in a sensing device or an actuating device for compactness and readiness for disposition of the control system in the vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Details of embodiments of a vehicle control system in the present invention are described with reference to the drawings.

Figure 1:
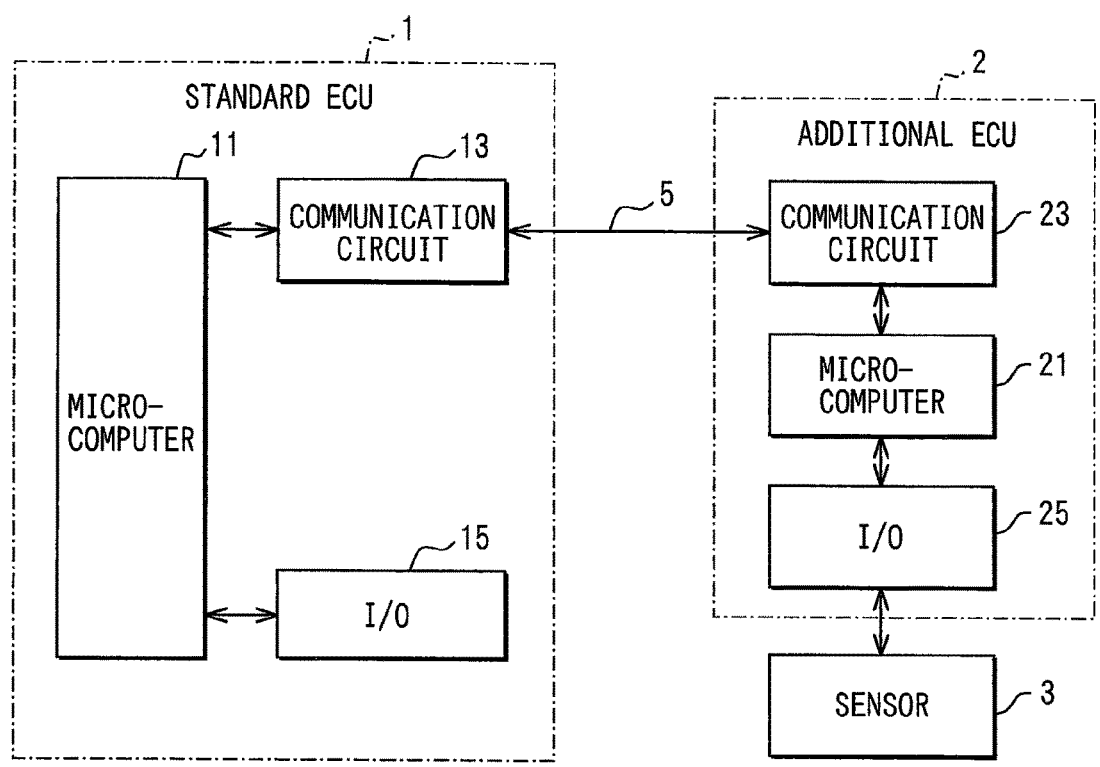
FIG. 1 shows a block diagram of a vehicle control system in an embodiment of the present invention.

FIG. 1 shows a basic structure of the vehicle control system that is common to the embodiments described hereinafter. Required functions of the vehicle control system are separately borne by two parts, that is, a standard function ECU 1 for controlling standard and thus not-frequently changing function in the vehicle, and an additional function ECU 2 for controlling an additional and thus relatively frequently changing function in the vehicle. The standard function ECU 1 and the additional function ECU 2 are connected each other through a wiring 5.

The standard function ECU 1 includes a microcomputer 11 for controlling the function of the ECU 1, a communication circuit 13 for controlling communication through the wiring 5 to and from the ECU 2 and other devices, an I/O (input and output) circuit 15 for controlling an input of sensor/switch signals for the microcomputer 11 and an output of instruction signals to an actuator or the like.

The additional function ECU 2 includes a microcomputer 21 for controlling the function of the ECU 2, a communication circuit 23 for controlling communication through the wiring 5 to and from the ECU 1 and other devices, an I/O circuit 25 for controlling an input of sensor/switch signals for the microcomputer 21 and an output of instruction signals to an actuator or the like.

The I/O circuit 25 is connected to a sensor 3 that is used by the ECU 2 for operating the additional function of the ECU 2.

FIG. 1 shows that only the sensor 3 is connected to the I/O circuit 25. However, the I/O circuit 25 may be connected to the actuator (not shown in the figure) for actuating a required device for the additional function. The I/O circuit 25 may be connected both of the sensor and the actuator.

Figure 2A:
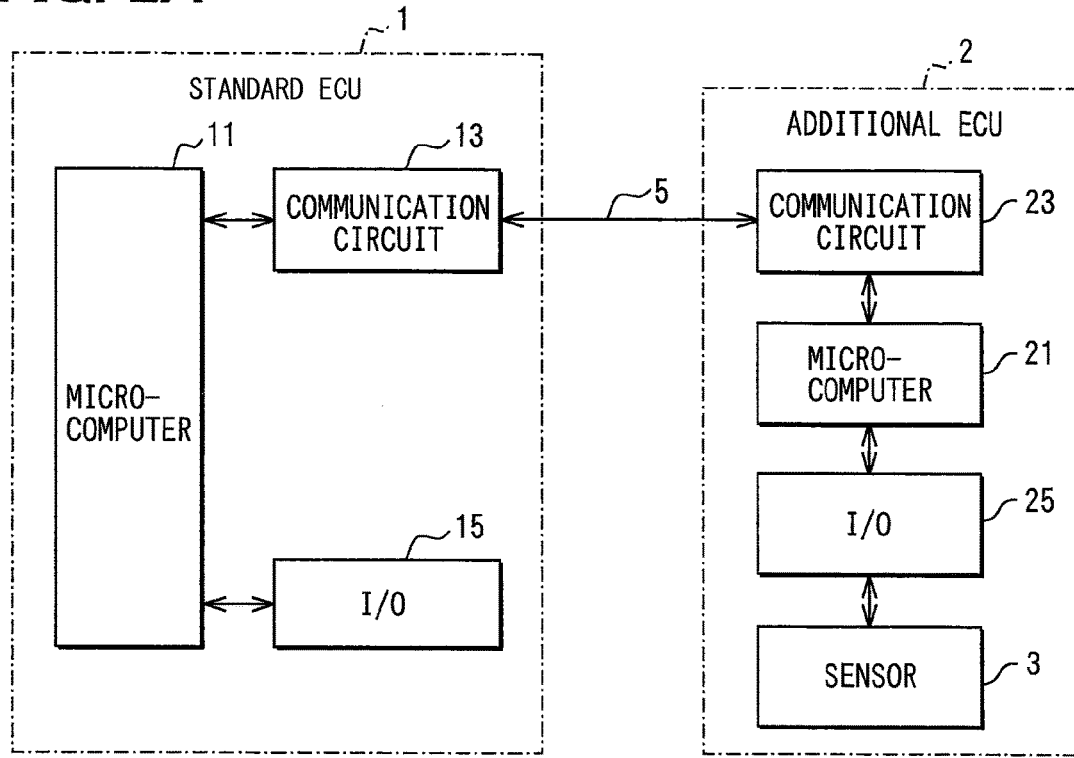
FIG. 2A shows a block diagram of a vehicle control system in another embodiment of the present invention.

The sensor and/or the actuator may be disposed in the ECU 2 as shown in FIG. 2A. That is, the ECU 2 may be integrally structured with the sensor 3 and/or the actuator according to the additional function for compactness.

Figure 2B:
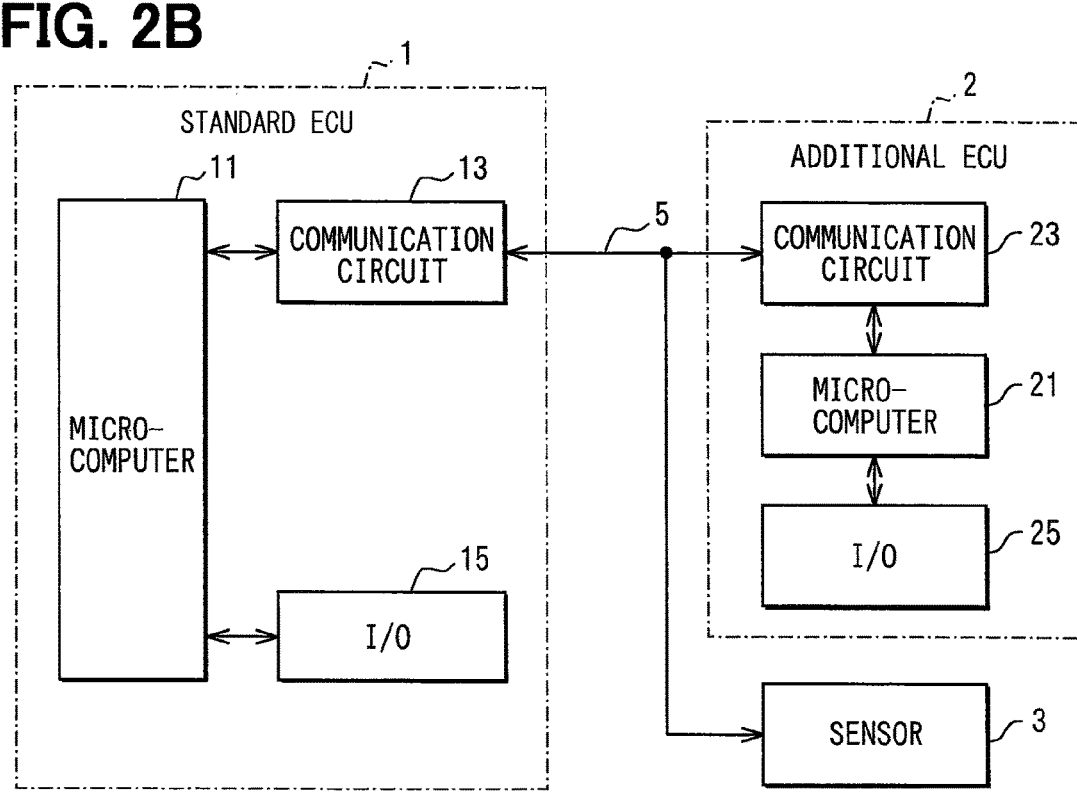
FIG. 2B shows a block diagram of a vehicle control system in yet another embodiment of the present invention.

The signal from the sensor 3 may be input through the wiring 5 and the communication circuit 23 instead of the I/O circuit 25 as shown in FIG. 2B.

First Embodiment

A first embodiment of the vehicle control system of the present invention includes a standard function ECU 1 for controlling a standard function, that is, in this case, maintaining a constant traveling speed of a subject vehicle, and an additional function ECU 2 for controlling an additional function, that is, in this case, maintaining a constant distance between a preceding vehicle and the subject vehicle based on a detected inter-vehicle distance. The sensor 3 in the ECU 2 is used for detecting the preceding vehicle and the distance thereto, and the sensor 3 is, for example, a millimetric-wave radar, a camera or the like.

Figure 3A:
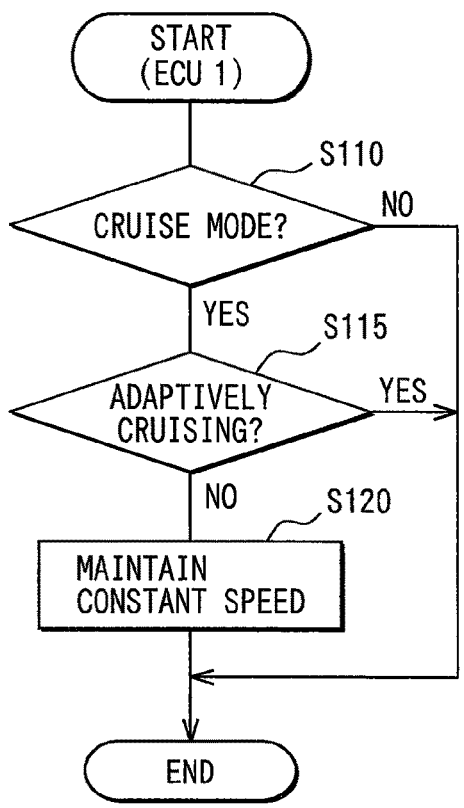
FIG. 3A shows a flowchart of a process executed in a microcomputer in an ECU in a first embodiment.
Figure 3B:
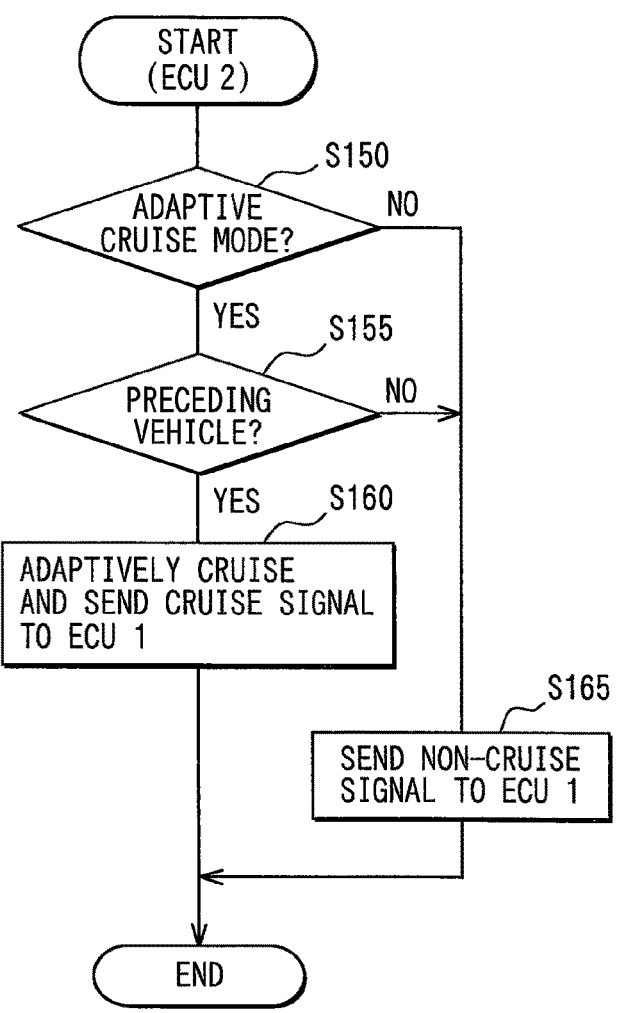
FIG. 3B shows a flowchart of a process executed in a microcomputer in another ECU in the first embodiment.

Next, the processes executed in the microcomputers 11, 21 are described with reference to flowcharts in FIGS. 3A and 3B. The flowchart in FIG. 3A is, for example, a process that is executed by the microcomputer 11 at a predetermined interval, and the flowchart in FIG. 3B is, for example, a process that is executed by the microcomputer 21 at a predetermined interval.

In step S110, the process determines whether a cruise control mode is set to the vehicle control system for traveling at a constant speed. The cruise control mode is set to the vehicle control system by a driver's operation of a switch (not shown in the figure).

The process of the flowchart proceeds to step S115 when the vehicle control system is in the cruise control mode (step S110:YES). The process proceeds to be concluded when the cruise control mode is not set (step S110:NO).

In step S115, the process determines whether the vehicle control system is in an adaptive cruise control mode for adaptively following the preceding vehicle based on a control signal from the additional function ECU 2. Details of the control signal from the additional function ECU 2 are described later. The process proceeds to step S120 when the adaptive cruise control mode is not set (step S115:NO). The process proceeds to be concluded when the adaptive cruise control mode is set (step S115:YES).

In step S120, the process executes constant speed control for the subject vehicle before it concludes the process itself. The constant speed control in step S120 is executed in a manner that the speed of the subject vehicle is adjustably controlled to a predetermined constant speed of the driver's choice by controlling an output of an engine or the like. The output of the engine is controlled by sending a control signal to a throttle ECU for controlling an opening of a throttle.

Next, the process in the additional function ECU 21 is described with reference to the flowchart in FIG. 3B.

In step S150, the process determines whether the adaptive cruise control is set. The adaptive cruise control mode is set by driver's operation of switches for both of the cruise control mode and adaptive cruise control mode (not shown in the figure). The process proceeds to step S155 when the adaptive cruise control mode is set (step S150:YES). The process proceeds to step S165 when the adaptive cruise control mode is not set (step S150:NO).

In step S155, the process determines whether there is a preceding vehicle based on a signal from the sensor 3. The process proceeds to step S160 when there is the preceding vehicle (step S155:YES). In this case, the process informs the ECU 1 of the operation of the adaptive cruise control in step S160. The adaptive cruise control in step S160 is conducted in a manner that the speed of the subject vehicle and an inter-vehicle distance between the preceding vehicle and the subject vehicle are adjustably controlled to a predetermined constant value of the driver's choice by controlling the output of the engine and/or the brake. The output of the engine is controlled by sending a control signal to a throttle ECU for controlling an opening of a throttle. The brake is controlled by sending a control signal to another ECU for controlling an application of the brake. The process proceeds to step S165 when there is no preceding vehicle (step S155:NO).

In step S165, the process informs the ECU 1 of non-operation of the adaptive cruise control. The process of the flowchart in FIG. 3B concludes after step S165.

The ECU 2 stops the operation of the adaptive cruise control and informs the ECU 1 of non-operation state of the adaptive cruise control during the operation of the adaptive cruise control, when the preceding vehicle is lost, for example, because of an acceleration of the preceding vehicle (step S155). The ECU 1 resumes the operation of the cruise control (step S115:NO→step S120). The adaptive cruise control is resumed when the subject vehicle catches up the preceding vehicle (step S155:YES→step S160).

The vehicle control system in the first embodiment can be adaptively modified to a change in specification of the adaptive cruise control (e.g., change of the sensor 3, or preceding vehicle detection logic or the like) without changing the ECU 1. That is, the ECU 2 solely accommodates the change in the specification, and thus the development period of the vehicle control system can be decreased for the improved productivity and cost performance compared to a case that the design of the intended functionality is implemented as a single ECU.

Further, the adaptive cruise control function can be easily omitted when it is specified as an optional function in the vehicle control system. That is, the cruise control function without the adaptive cruise control sub-function can be prepared only by omitting the additional function ECU 2. In this manner, the cruise control function having the optional function can be readily implemented by using the ECUs.

Second Embodiment

In a second embodiment of the present invention, the standard function ECU 1 is used for controlling the operation of a wiping system based on an input from a switch by a user, and the additional function ECU 2 is used for detecting the amount of rain and controlling wiping frequency. In this scheme of ECU structure, the sensor 3 is a rain sensor for detecting the rain on the windshield or the like. The sensor 3 includes a light emission element such as an LED for emitting a light and a light reception element such as a photo transistor for receiving a reflection of the light on the windshield or the like. The amount of the received light is converted to a signal for representing the amount of the rain on the windshield or the like.

Figure 4A:
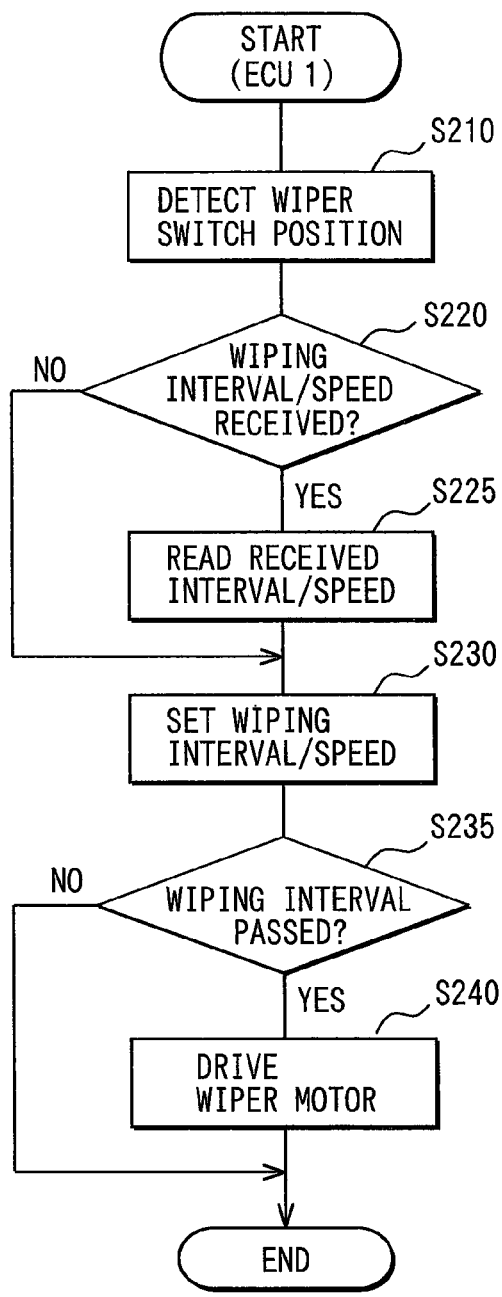
FIG. 4A shows a flowchart of a process executed in a microcomputer in an ECU in a second embodiment.
Figure 4B:
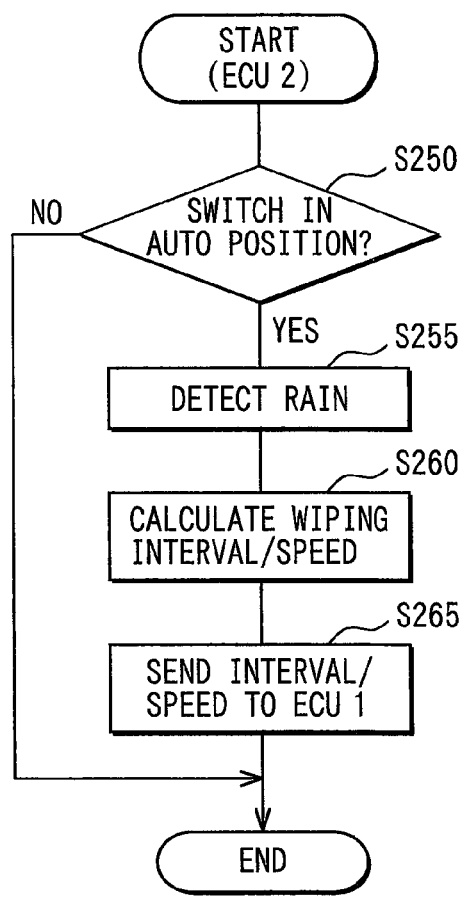
FIG. 4B shows a flowchart of a process executed in a microcomputer in an ECU in the second embodiment.

The processes executed in the ECU 1 and ECU 2 are described with reference to flowcharts in FIGS. 4A and 4B. The flowchart in FIG. 4A is, for example, a process that is executed by the microcomputer 11 at a predetermined interval, and the flowchart in FIG. 4B is, for example, a process that is executed by the microcomputer 21 at a predetermined interval.

In step S210, the microcomputer 11 in the ECU 1 detects a position of the wiper operation switch. The wiper operation switch is either in a HI position, a MID position, a LOW position, an AUTO position, or an OFF position. The detected position of the switch is also transferred to the ECU 2.

In step S220, the process determines whether it received a wiping interval, a wiper operation speed. The process proceeds to step S230 when it has not received the interval and the speed (step S220:NO). The process proceeds to step S225 for retrieving the received interval and the speed when the interval and the speed is already received (step S220: YES). The process proceeds to step S230 after the interval and speed are retrieved. In this case, the ECU 2 sends the wiping interval and the wiping speed to the ECU 1 when the wiper operation switch is in the AUTO position by the process shown in FIG. 4B.

In step S230, the wiping interval and the wiping speed are controlled according to the position of the wiper operation switch. That is, the wiping interval is set to infinite when the wiper operation switch is in the OFF position. The wiping speed is set accordingly when the switch is either in the HI, MID, or LOW position. The interval of the operation is set to zero for a continuous operation. The wiping interval and speed are set by using the interval/speed retrieved in step S225 when the switch is in AUTO position.

In step S235, the operation timing set in step S230 is detected. That is, an elapsed time from the last operation is compared with the wiping interval set in step S230. When the timing is right for the operation of the wiper (step S235:YES), the process proceeds to step S240 and the wiper is operated at a speed set in step S230. The process concludes after wiper operation.

When the elapsed time from the last operation has not reached the interval set by the switch (step S235:NO), the process concludes without operating the wiper.

FIG. 4B shows a flowchart for the process executed in the microcomputer 21 of the additional function ECU 2.

In step S250, the process determines whether the position of the wiper switch is in the AUTO position based on the information received from the ECU 1. The process concludes when the switch is not in the AUTO position (step S250:NO). The process proceeds to step S255 for detecting the amount of the rain by the sensor 3 when the wiper operation switch is in the AUTO position (step S250:YES).

In step S260, the process calculates the wiping interval and the wiping speed based on the detected amount of the rain and the speed of the vehicle. The speed of the vehicle is received from other ECU connected to the wiring 5. The wiping interval set in this decreases in proportion to the amount of the rain and the speed of the vehicle. The wiping speed is also determined in accordance with the amount and the speed, that is, the speed increases when the amount of the rain and the speed of the vehicle increase.

In step S265, the wiping interval and speed calculated in step S260 are sent to the ECU 1 before the process concludes itself. The interval and the speed sent to the ECU 1 are used in step S230 of the flowchart in FIG. 4A.

Therefore, the wiper is operated by the ECU 1 at the interval and the speed set by the wiper operation switch when the position of the wiper switch is either in the HI, MID, or LOW position. The wiper is operated according to a suitable wiping interval and speed calculated by the ECU 2 when the position of the wiper operation switch is in the AUTO mode.

The vehicle control system in the second embodiment does not have to change the design of the standard function ECU 1 when specification of operation corresponding to the AUTO position of the operation switch is changed. That is, for example, change in the specification of rain detection logic, wiper speed calculation logic, rain detection sensor type or the like may be accommodated by re-designing of the ECU 2. Therefore, the development period of the vehicle control system can be decreased for the improved productivity and cost performance.

Further, the AUTO position of the wiper operation function can be easily omitted when it is specified as an optional function in the vehicle control system. That is, the wiper control function without having the AUTO position can be prepared only by omitting the additional function ECU 2. In this manner, the wiper operation function having an optional function can be easily implemented by using the ECUs.

Third Embodiment

As the third embodiment, a high/low beam control function for a headlight in cooperation with a horizontal swivel function may be implemented as a combination of the primary and secondary ECUs. In this case, a basic headlight function such as ON/OFF operation of the headlight, manual high/low beam switching and the like is controlled by using the function implemented in the primary ECU (ECU 1) which is based on an input of user switch operation, while an automatic high/low beam control and an automatic swivel control of the headlight is managed by using the function implemented in the secondary ECU (ECU 2) beside detecting an on-coming vehicle and road curvature of the traveling road. Therefore, the changes in specification of the headlight control function such as an on-coming vehicle detection logic for high-low beam control, a curve detection logic for a swivel control, and/or a sensor model are accommodated only by the re-designing of the ECU 2. In this manner, the development of the vehicle control system for the headlight control is facilitated for increased effectiveness and functionality. Further, the sensor 3 is a light sensor for the detection of the on-coming vehicle, and the I/O circuit 25 of the ECU 2 is connected to an actuator that changes the direction of light axis of the headlight.

The process performed by each of the microcomputers 11, 21 of the ECU 1, 2 is described in the following based on the flowcharts in FIGS. 5A and 5B.

Figure 5A:
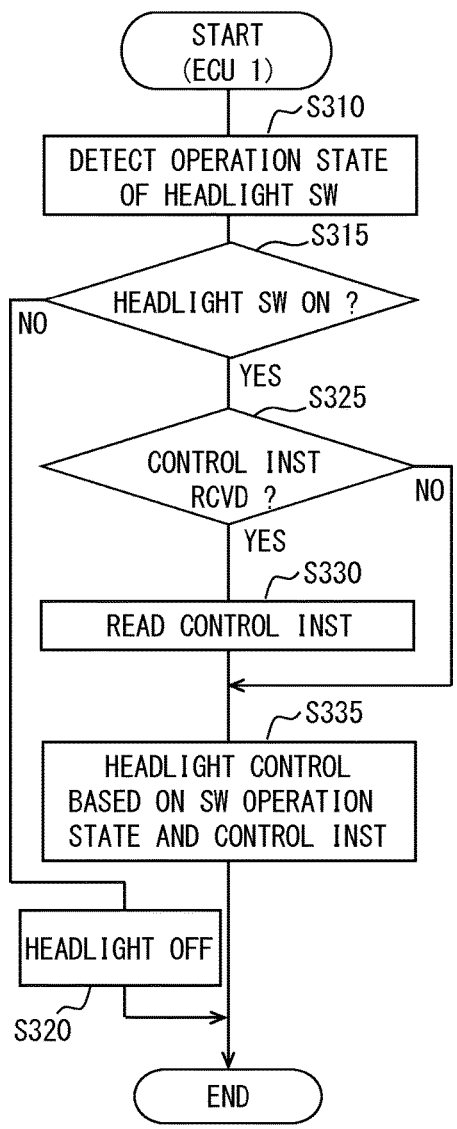
FIG. 5A shows a flowchart of a process executed in a microcomputer in an ECU in a third embodiment.
Figure 5B:
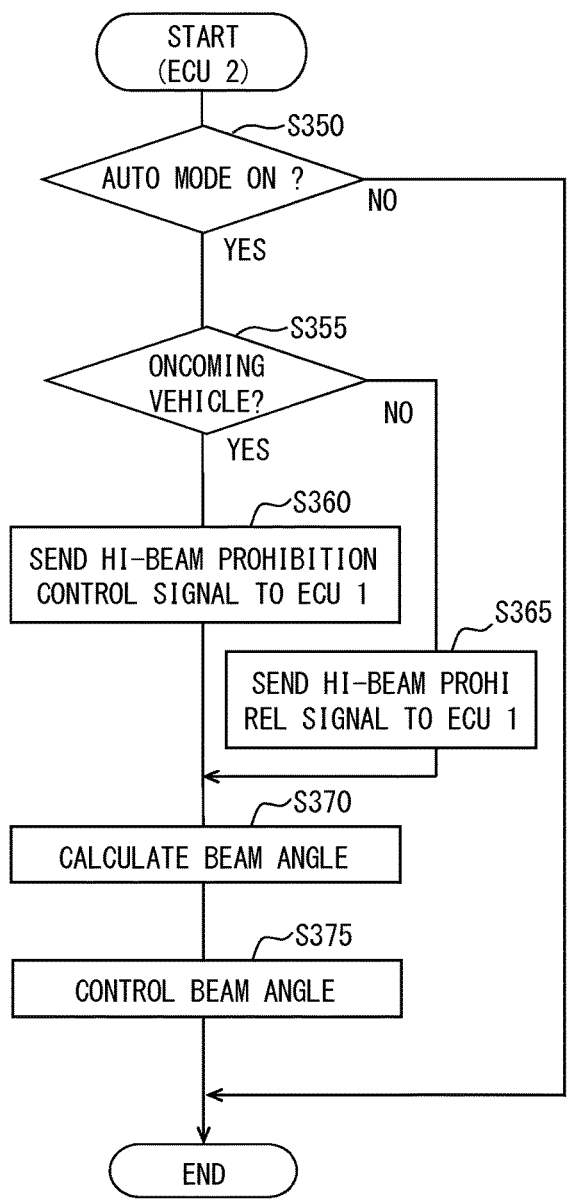
FIG. 5B shows a flowchart of a process executed in a microcomputer in an ECU in the third embodiment.

The flowchart in FIG. 5A is a process performed by the microcomputer 11 of the ECU 1 at a predetermined interval, for example, and the flowchart in FIG. 5B shows a process performed by the microcomputer 21 of the ECU 2 at a predetermined interval.

As shown in FIG. 5A, the microcomputer 11 of the standard function ECU 1 detects an operation state of the headlight relevant switch by the user in S310 first. As the headlight relevant switch, a small lamp switch for lighting a small lamp and a position lamp, a headlight switch for lighting the headlight, a beam switching switch for switching a high beam and a low beam (i.e., more specifically, switching between a turning-ON of a low beam bulb and a turning-ON of a high beam bulb), and an auto mode switch are provided, and the auto mode switch is effective when the headlight switch is turned ON. The operation state of the switch detected in S310 is transmitted to ECU 2.

Next, in S315, it is determined whether the headlight switch is turned ON, and, when the headlight switch is not turned ON in S315 (S315:NO), the process proceeds to S320, and the headlight is turned OFF (i.e., the low beam bulb and the high beam bulb are both turned OFF), and the process is finished.

When it is determined that the headlight switch is turned ON in S315 (S315:YES), the process proceeds to S325.

It is then determined, in S325, whether the control instruction about the headlight from ECU 2 is received. When the control instruction is not received (S325:NO), the process proceeds to S335, but, when the control instruction has already been received (S325:YES), the process proceeds to S335 after reading the control instruction which is received in S330. Further, when the headlight switch and the auto mode switch are both turned ON, as shown in a process of FIG. 5B that is mentioned later, one of a high beam prohibition control instruction prohibiting the use of the high beam or a high beam prohibition release control instruction releasing the prohibition of high beam use is transmitted from ECU 2 to ECU 1.

In S335, based on the operation state of the beam switching switch detected in S310 and the control instruction from ECU 2 read in S330, the headlight control is performed, and the process is then finished.

Here, the headlight control of S335 is performed according to the following manner.

First, when the beam switching switch is operated to the low beam side, the low beam bulb is turned ON.

When the beam switching switch is operated to the high beam side, according to the control instruction from ECU 2, one of the high beam bulb and the low beam bulb is turned ON. In other words, if no control instruction from ECU 2 is read in S330 or the latest control instruction read in S330 is the high beam prohibition release control instruction, the high beam bulb is turned ON. If, on the other hand, the latest control instruction read in S330 is the high beam prohibition control instruction, the low beam bulb is turned ON.

Although not shown in the flowchart of FIG. 5A, when the small lamp switch is turned ON, ECU 1 turns ON the small lamp and the position lamp, and performs an illumination control which dims the lighting in the instrument panel, and the lighting of various control switches.

Next, as shown in FIG. 5B, the microcomputer 21 of the additional function ECU 2 first determines whether the auto mode switch is turned ON in S350 based on the information received from ECU 1, and, when the auto mode switch is not turned ON (S350:NO), the process is once finished.

When it is determined that the auto mode switch is turned ON in S350 (S350:YES), the process proceeds to S355, and determines existence of an oncoming vehicle based on the state of light from the front side of the vehicle detected by the sensor 3.

When it is determined that there is an oncoming vehicle (S355:YES), in S360, the high beam prohibition control instruction is transmitted to ECU 1, and the process proceeds to S370 after that.

When it is determined that there is no oncoming vehicle (S355:NO), in S365, the high beam prohibition release control instruction is transmitted to ECU 1, and the process proceeds to S370 after that.

In S370, the curve state of the traveling road of the subject vehicle is detected, and the beam angle of the horizontal direction of the headlight are calculated according to the detection result.

More practically, based on the signal from the steering sensor, the operation angle of the steering wheel is detected, and the curve state (i.e., the curve direction and the degree of the curve) of the road is detected based on the steering operation angle. Further, the beam angle of the horizontal direction of the headlight is calculated so that the light from the headlight lights the front part of the curved road of the subject vehicle based on the detected curve state. Further, the curve state of the road may also be obtained from a navigation apparatus via the communication line 5, as road shape information of the traveling road.

Then, in S375, the actuator for controlling the light axis of the headlight is driven, so that the beam angle of the horizontal direction is controlled to the calculated angle in S370. The process is then finished.

According to the control of ECU 2 described above, when the auto mode switch of the light is turned ON, the headlight is switched from the high beam to the low beam (i.e., the high beam bulb is tuned OFF and the low beam bulb is tuned ON) during a passing-by period of the oncoming vehicle, i.e., from an encounter to a departure of the oncoming vehicle, thereby preventing the driver of the oncoming vehicle from being dazzled by the high beam of the subject vehicle based on an automatic low beam control of the headlight. Further, the beam angle of the headlight of the horizontal direction is controlled to always light the front part of the subject vehicle as the vehicle travels the curved road.

According to the vehicle control system of the present embodiment, the specification changes of the two functions, the vertical beam angle control function for auto-control of the up-down direction of the headlight based on the detection of the oncoming vehicle and the horizontal beam angle control function for auto-control of the right-left direction of the headlight based on the detection of the curve state of the road, do not affect the standard function ECU 1 and such changes are accommodated by the design change of the additional function ECU 2. That is, when, for example, the sensor type of the sensor 3, the detection logic of the oncoming vehicle, the up-down beam angle changing method, or the detection logic of the curve state of the road is changed, such a change of those functions is absorbed only by the change of the additional function ECU 2. Therefore, the development period and cost of the vehicle control system is reduced, and the development efficiency is improved. Further, when the above-described functions are optional to the vehicle, whether to provide the optional functions for the vehicle or not is easily controllable by simply adding or removing the additional function ECU 2 to/from the vehicle.

Fourth Embodiment

The vehicle control system according to the fourth embodiment of the present disclosure is described. In the present embodiment, the standard function ECU 1 performs a control for operating a vehicle air conditioner according to an input of user switch operation, and the additional function ECU 2 performs, as a control of the additional function, air temperature and amount control for each of many parts in the vehicle compartment based on the detection results of the number of occupants, the position of occupants, and the face direction of occupants. Therefore, the sensor 3 is a camera which captures each of many seats in the vehicle.

Figure 6A:
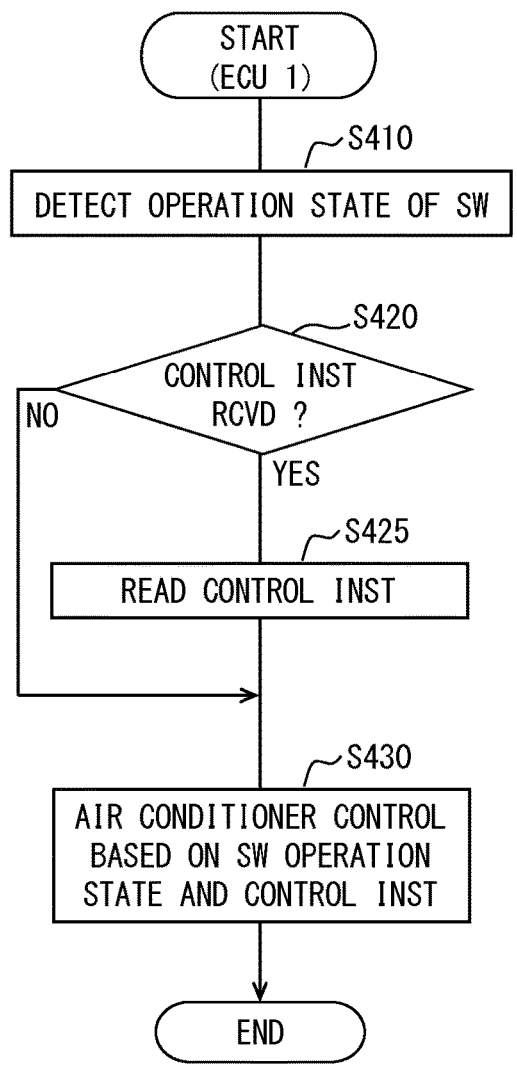
FIG. 6A shows a flowchart of a process executed in a microcomputer in an ECU in a fourth embodiment.
Figure 6B:
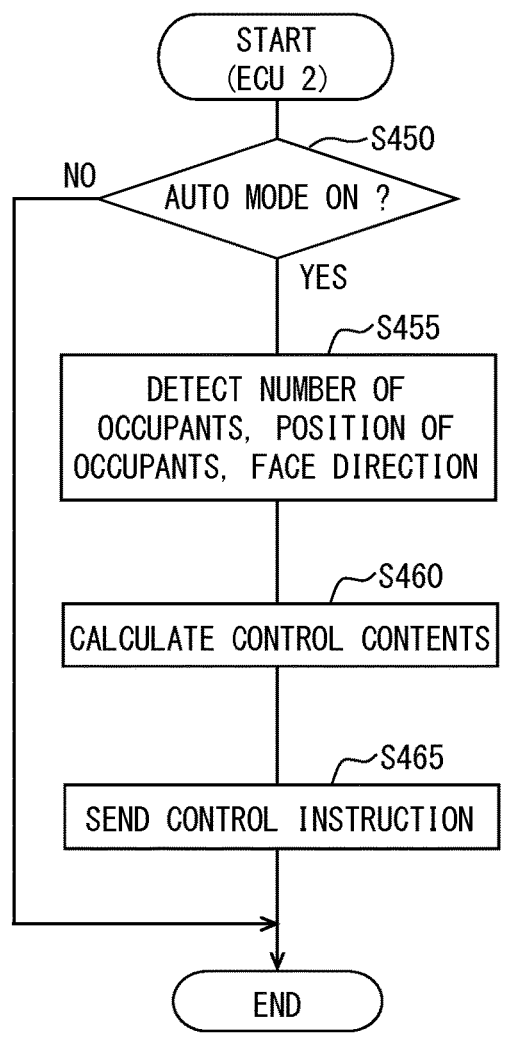
FIG. 6B shows a flowchart of a process executed in a microcomputer in an ECU in the fourth embodiment.

The process performed in each of the microcomputers 11 and 21 of ECUs 1 and 2 is described based on the flowchart of FIGS. 6A and 6B.

FIG. 6A shows a flowchart of a process performed by the microcomputer 11 of the standard function ECU 1 at a predetermined interval, and FIG. 6B shows a flowchart of a process performed by the microcomputer 21 of the additional function ECU 2 at a predetermined interval.

As shown in FIG. 6A, the microcomputer 11 of the standard function ECU 1 detects the user operation state of the switch relevant to the air-conditioner in S410 first. The switch relevant to the air-conditioner may be, for example, an air-conditioner ON/OFF switch, a temperature setting switch (or a dial), an air amount setting switch, an air outlet position switch, and an auto mode switch. The operation state of the switch detected in S410 is transmitted to ECU 2.

Then, it is determined, in S420, whether the control instruction about the air-conditioner from ECU 2 is received. When the control instruction is not received (S420:NO), the process proceeds to S430. When the control instruction has already been received (S420:YES), the process proceeds to S430 after reading the received control instruction in S425. When the auto mode switch is turned ON, as shown in a process of FIG. 6B that is mentioned later, the air temperature and amount control instruction for controlling the temperature and the amount of air blown out to various parts of the vehicle compartment is transmitted from ECU 2 to ECU 1. That is, for example, the temperature of the air, the amount of the air, and the outlet position of the air are automatically controlled in the auto mode.

Then, in S430, based on the operation state of the switch detected in S410 and the control instruction from ECU 2 read in S425, the air-conditioner control is performed, and the process is finished thereafter.

Here, the air-conditioner control of S430 is performed in the following manner.

First, when the auto mode switch is not turned ON, the air temperature, the air amount, the air outlet position and the like are controlled according to an operation state of each of the temperature setting switch (or a dial), the air amount setting switch, the air outlet position switch and the like. In other words, the air-conditioner is manually controlled according to the user switch operation.

When the auto mode switch is turned ON, the air-conditioner is controlled according to the control instruction from ECU 2. In other words, when the control instruction from ECU 2 is not yet read in S330, according to the auto mode logic memorized beforehand, the air-conditioner is operated. When the control instruction from ECU 2 has already been read in S330, the air-conditioner is operated according to the control instruction regarding the temperature, the amount, the outlet position.

Then, the microcomputer 21 of the additional function ECU 2 first determines whether the auto mode switch is turned ON in S450, based on the information received from ECU 1 as shown in FIG. 6B. When it is determined that the auto mode switch is not turned ON (S450:NO), the process is finished.

When it is determined that the auto mode switch has already been turned ON in S450 (S450:YES), the process proceeds to S455, and the number of occupants, the positions of occupants, and the face direction of occupants in the vehicle compartment are detected based on the image captured by the camera, i.e., by the sensor 3.

Then, in S460, the temperature and the amount of air blown out from the outlet of the air-conditioner are calculated as the control contents, so that the temperature of the air around the positions of occupants and around the faces of occupants detected in S455 becomes predetermined optimal temperature, or becomes the manually-set temperature.

Then, in S465, the control instruction indicating the control contents calculated in S460 is transmitted to ECU 1, and the process is finished.

Then, ECU 1 adjusts the temperature and the amount of air blown out from the outlets of the air-conditioner, according to the control instruction from ECU 2, in S430 of FIG. 6A.

According to such control of ECU 2, when the auto mode switch is turned ON, the air temperature and amount is automatically adjusted to achieve the optimal temperature or the manually-set temperature around the position/face of occupants, according to the number, positions, and the face direction of occupants.

According to the vehicle control system of the present embodiment, specification changes of the air-conditioner control function for controlling the air conditioner based on the detection results of the number, positions, and the face directions do not affect the standard function ECU 1. That is, such changes are simply accommodated by the design change of the additional function ECU 2. For example, even when the sensor type of the sensor 3 or the control contents of the sensor 3 is changed, such changes are absorbed only by ECU 2. Therefore, the development period and cost of the vehicle control system is reduced, and the development efficiency is improved. Further, when the above-described functions are optional to the vehicle, whether to provide the optional functions for the vehicle or not is easily controllable by simply adding or removing the additional function ECU 2 to/from the vehicle.

Further, the system utilizing the detection results of the number of occupants, the positions of occupants and the like may be not only the air-conditioner control system, but also the audio system, in which the vehicle audio system is controlled by the standard function ECU 1 and the additional function ECU 2, among which ECU 1 controls the basic functions such as the ON and OFF of the system, while ECU 2 controls the sound field and effects based on the detection results of the number/position of occupants, for the adjustment of optimal sound at the position of each of the detected occupants by the adjustment of output and direction of the speakers.

According to such a vehicle control system, even when the specification of the function for detecting the occupant number and position and for controlling the audio system is changed, the change is simply accommodated by the design change of ECU 2, and the optional use of such function is controllable by the addition or the removal of ECU 2 only.

Fifth Embodiment

The vehicle control system of the fifth embodiment of the present disclosure is described. In the present embodiment, the standard function ECU 1 performs a control, in which a vehicle collision is detected and the seatbelt is tightened by a standard function, and the additional function ECU 2 performs a control in which a possible collision of the vehicle is detected and the seatbelt is tightened by an additional function. Therefore, as for the sensor 3, a sensor for detecting a possibility of collision is used, such as a laser radar, a millimeter wave radar or the like.

Figure 7A:
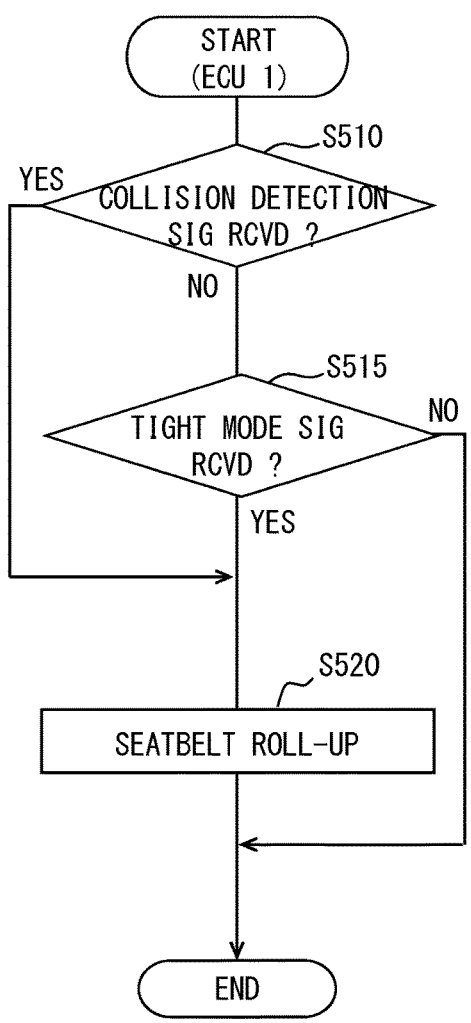
FIG. 7A shows a flowchart of a process executed in a microcomputer in an ECU in a fifth embodiment.
Figure 7B:
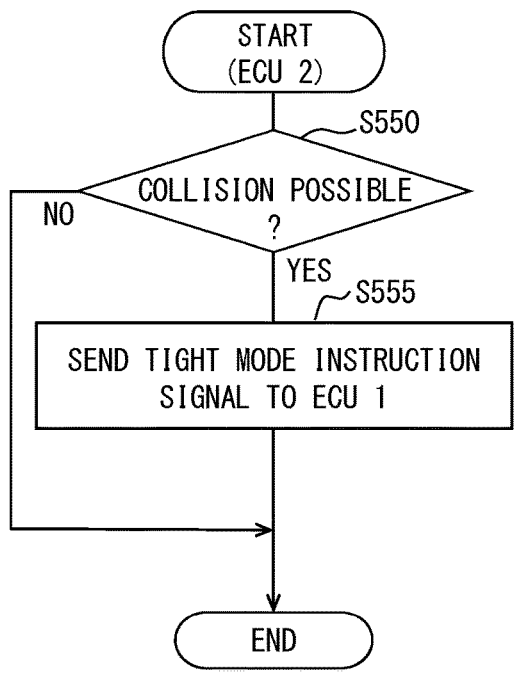
FIG. 7B shows a flowchart of a process executed in a microcomputer in an ECU in the fifth embodiment.

Next, the processes performed by the microcomputers 11 and 21, i.e., by ECU 1 and ECU 2, are described based on the flowchart of FIGS. 7A and 7B.

FIG. 7A shows a flowchart of a process performed by the microcomputer 11 of the standard function ECU 1 at a predetermined interval, and FIG. 7B shows a flowchart of a process performed by the microcomputer 21 of the additional function ECU 2 at a predetermined interval.

As shown in FIG. 7A, when it is determined, in S510, whether a collision detection signal is inputted from an air bag ECU, and, if the collision detection signal is inputted (S510:YES), the microcomputer 11 of the standard function ECU 1 determines that the subject vehicle has collided, and the process proceeds to S520.

The air bag ECU operates, i.e., inflate, the air bag, when it detects that the vehicle has collided based on the signal from the acceleration sensor, the impact sensor, etc. installed in the vehicle, and it outputs a collision detection signal. Further, the collision detection signal from the air bag ECU may be inputted to ECU 1 via the communication line 5, or may be directly input to ECU 1 without passing the communication line 5.

Then, in S520, the actuator for a seat belt roll up function is operated for tightening the tension of the seatbelt and for the improvement of the safety of the occupant, and the process is finished thereafter.

If it is determined, in S510, that the collision detection signal is not inputted (S510:NO), the process proceeds to S515, and it is determined whether a tight mode instruction signal is received from ECU 2.

Then, if the tight mode instruction signal has not yet received (S515:NO), the process is finished. If the tight mode instruction signal has already been received (S515:YES), the process proceeds to S520, and the occupant safety is improved by rolling up the seatbelt, and the process is finished.

Next, as shown in FIG. 7B, the microcomputer 21 of the additional function ECU 2 determines, in S550, whether the subject vehicle has a possibility of collision based on the signal from the sensor 3.

More specifically, an object in front of the subject vehicle is recognized and a measurement indicator indicating a distance between the subject vehicle and the front object, such as a relative distance, a relative speed, a relative acceleration or the like, is quantified. Then, if the measurement indicator indicates that the collision of the subject vehicle with the front object is unavoidable, it is determined that the subject vehicle has a possibility of collision. In other words, the collision of the subject vehicle is predicted.

Then, if it is determined, in S550, that the subject vehicle does not have a possibility of collision (S550:NO), the process is finished.

If it is determined, in S550, that the subject vehicle has a possibility of collision (S550:YES), the process is finished after proceeding to S555 and transmitting the tight mode instruction signal to ECU 1. Then, ECU 1 performs a roll up operation of the seat belt in S520 of FIG. 7A mentioned above according to the tight mode instruction signal from ECU 2.

According to the vehicle control system of the fifth embodiment, even when specification change of the function regarding the collision possibility determination and seatbelt roll up operation is caused (e.g., even when the type of the sensor 3, the logic of the collision prediction, etc. are changed), such a change does not affect the standard function ECU 1, and the design change of only the additional function ECU 2 can accommodate the change. Further, if the above-described function is optional, whether to provide the optional function to the vehicle or not is easily controllable by simply adding or removing the additional function ECU 2 to/from the vehicle.

Sixth Embodiment

The vehicle control system of the sixth embodiment is described, in which the standard function ECU 1 performs, as a control of the standard function, a control other than a valve timing control regarding an engine in the vehicle, and the additional function ECU 2 performs the valve timing control as a control of the additional function.

The valve timing control is a well-known actuator control, for controlling, i.e., for changing, a valve open-close timing of both of the intake valve and the exhaust valve. Therefore, an actuator for controlling the valve open-close timing is connected to an input/output circuit 25 of ECU 2. In terms of communication, ECU 1 may provide engine operation state information to ECU 2 which is required for the valve timing control via the communication line 5, or a signal representing the engine operation state may be directly input to ECU 2.

According to the vehicle control system of the sixth embodiment, even when the specification change of the valve timing control is caused, i.e., even when the type and control logic of the actuator are changed, the design change of ECU 2 only can accommodate such a change, and the valve timing control can be added or removed to/from the vehicle simply by adding or removing ECU 2 to/from the vehicle.

Seventh Embodiment

The vehicle control system of the seventh embodiment is described in the following, in which a control for a standard display function for displaying indicators in an instrument panel, i.e., a speedometer for displaying travel speed of the vehicle and a tachometer for displaying engine rotation number, is performed by the standard function ECU 1, and a control for an additional display function for displaying information on a windshield of the vehicle is performed by the additional function ECU 2.

The information which is displayed on the windshield by ECU 2 may be, for example, a travel route guidance provided from the navigation ECU via the communication line 5 (i.e., right/left turn instruction, a shape of approaching intersection, or the like) and an infra-red light image that is captured by an infra-red light camera about a front field of the vehicle.

According to the vehicle control system of the seventh embodiment described above, even when the specification change of the function for displaying information on the windshield is caused, such a change is accommodated by simply changing the design of ECU 2. To provide or not to provide the windshield information display function is controllable by adding or removing ECU 2 to/from the vehicle.

Eighth Embodiment

The vehicle control system of the eighth embodiment is described, in which a control of the standard function for receiving VICS information from an FM radio station and providing information to the vehicle occupant is performed by the standard function ECU 1 (i.e., Vehicle Information and Communication System VICS implemented in Japan), and a control of the additional function for performing communication with a roadside DSRC device and providing information for the vehicle occupant is performed by the additional function ECU 2 (DSRC: Dedicated Short Range Communication).

According to the vehicle control system of the eighth embodiment, even when specification change of the information providing function via the DSRC communication device is changed, such a change is accommodated by the design change of ECU 2 only. Further, to provide the information providing function or not is controllable by adding or removing ECU 2 to/from the vehicle.

A modification of the eighth embodiment may be provided in the following manner. That is, besides providing a first ECU for a normal ETC (Electric Toll Collection) control, a second ECU may further be provided for a highway information processing function that receives traffic information such as traffic congestion, accident, construction work or the like from a DSRC communication device and sends the received and processed information to the standard function ECU 1 for the provision to the vehicle occupant. The second ECU is provided in a separate package, and the second ECU corresponds to the additional function ECU 2 for performing a control of the additional function, which is an "evolving" function that is expected to evolve in the near future or step by step in succession.

As for present disclosure, detailed description is provided above, which may further be expanded into various forms and embodiments as long as the gist of the disclosure is kept intact.

For example, in each of the above-mentioned embodiments, the controls performed by ECU 1 and ECU 2 may be other than the above.

The control of the function performed by ECU 1 in each of the above-mentioned embodiments may be aggregated into only one ECU. In such case, the multiple strand functions that are expected to have changes are integrated into one ECU, while additional evolving functions are performed, one by one, by a dedicated ECU respectively specializing one of those functions.

Further, one standard function ECU may be associated many additional function ECUs. For example, the basic headlight function of the standard function ECU in the above-mentioned embodiment may be supplemented by an oncoming vehicle detection function of one ECU for detecting an light amount for detecting an oncoming vehicle and a beam angle control function of the other ECU for controlling a beam angle, for the freedom of choice of those functions by a purchaser of the vehicle.

Merely for the sake of thoroughness, the primary ECU and the secondary ECU in the above-described embodiments may be used to implement other kind of functions. Further, the secondary ECU that bears a modification-prone function may be divided for accommodating more detailed/specific functions to facilitate the development of the vehicle control system.

Such changes and modifications are to be understood as being within the scope of the present invention as defined by the appended claims.

What is claimed is:

1. An electric control unit in a headlight control system, the electric control unit comprising:
   a sensor detecting an existence of an oncoming vehicle;
   a first electric control unit circuit connected to the sensor to control an automatic high beam control function that automatically turns a high beam light on or off, the control of the automatic high beam control function performed according to whether the oncoming vehicle is detected; and
   a second electric control unit circuit in communication with the first electric control unit circuit, the second electric control unit circuit controlling a headlight operating function that operates the headlight according to a switch operation by a vehicle user, wherein
   the headlight control system controls the automatic high beam control function based on a switch operation state that is received from the first electric control unit circuit.

2. An electric control unit in a headlight control system, the electric control unit comprising:
   a sensor in a vehicle that detects a location of an oncoming vehicle;
   a first electric control unit circuit connected to the sensor to control an automatic angle control function that automatically controls a beam angle of a headlight of the vehicle, the control of the automatic angle control function being performed according to where the oncoming vehicle is located; and
   a second electric control unit circuit in communication with the first electric control unit circuit, the second electric control unit circuit controlling a headlight operating function that operates the headlight according to a switch operation by a vehicle user, wherein
   the first electric control unit circuit is in communication with the second electric control unit circuit via an in-vehicle communication line, and
   the first electric control unit circuit controls the automatic angle control function based on a switch operation state that is received from the second electric control unit circuit.

3. An electric control unit system controlling a headlight of a vehicle, the electric control unit system comprising:
   a sensor that detects whether there is an oncoming vehicle;

a first electric control unit circuit connected to the sensor to control an automatic angle control function that automatically controls an up-down change in a vertical angle of a light beam of the headlight, the control of the automatic angle control function being performed when the sensor detects the oncoming vehicle; and the first electric control unit circuit in communication with a second electric control unit circuit that controls a headlight operating function that operates the headlight according to a switch operation by a vehicle user, wherein the first electric control unit circuit is in communication with the second electric control unit circuit via an in-vehicle communication line, and the first electric control unit circuit controls the automatic angle control function based on a switch operation state that is received from the second electric control unit circuit.

4. The electric control unit of claim 1, wherein
the first electric control unit circuit is separately disposed from the second electric control unit circuit.

5. The electric control unit of claim 1, wherein
the sensor for detecting the oncoming vehicle and the second electric control unit circuit are separately disposed in the vehicle.

6. The electric control unit of claim 5, wherein
the sensor is connected to the second electric control unit circuit via an in-vehicle communication line.

7. The electric control unit of claim 1, wherein
the sensor for detecting the oncoming vehicle and the first electric control unit circuit are integrally disposed in the vehicle.

8. The electric control unit of claim 1, wherein
the second electric control unit circuit controls a direction of a light beam of the headlight based on detection of a curvature of a road where the vehicle is traveling.

9. A headlight control system controlling a headlight of a vehicle, the system comprising:

a first electric control unit circuit controlling a headlight operating function that operates the headlight according to a switch operation by a vehicle user; a sensor located in the vehicle;

a second electric control unit circuit selectively installed in the vehicle and in communication with the sensor, the second electric control unit circuit controlling an automatic angle control function that automatically controls a vertical angle of a light beam of the headlight based on communication with the first electric control unit circuit via an in-vehicle communication line, the control of the automatic angle control function being performed according to a detection result of an oncoming vehicle by the sensor, wherein the second electric control unit circuit, installed in the vehicle and in communication with the first electric control unit circuit, controls the automatic angle control function based on a switch operation state that is received from the first electric control unit circuit.

10. The headlight control system of claim 9, wherein
the sensor and the second electric control unit circuit are separately disposed in the vehicle.

11. The headlight control system of claim 9, wherein
the sensor and the second electric control unit circuit are integrally disposed in the vehicle.

12. The headlight control system of claim 9, wherein
the second electric control unit circuit is capable of performing a preceding vehicle follow function to control the vehicle to follow a preceding vehicle.

* * * * *